United States Patent
Park et al.

(10) Patent No.: US 11,005,620 B2
(45) Date of Patent: May 11, 2021

(54) UPLINK REFERENCE SIGNAL SEQUENCE DESIGN IN 5G NEW RADIO

(71) Applicant: QUALCOMM Incorporated, San Diego, CA (US)

(72) Inventors: Seyong Park, San Diego, CA (US); Renqiu Wang, San Diego, CA (US); Yi Huang, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/008,908

(22) Filed: Jun. 14, 2018

(65) Prior Publication Data

US 2018/0367271 A1 Dec. 20, 2018

Related U.S. Application Data (60) Provisional application No. 62/521,200, filed on Jun. 16, 2017.

(51) Int. Cl.
*H04W 4/00* (2018.01)
*H04L 5/00* (2006.01)
*H04L 27/26* (2006.01)

(52) U.S. Cl.
CPC ........ *H04L 5/0048* (2013.01); *H04L 27/2613* (2013.01); *H04L 27/2614* (2013.01)

(58) Field of Classification Search
CPC .................................................. H04L 5/0048
USPC ......... 370/329–330, 335–337, 342–345, 347
See application file for complete search history.

(56) References Cited

U.S. PATENT DOCUMENTS

| | | | | |
|---|---|---|---|---|
| 5,960,395 | A * | 9/1999 | Tzirkel-Hancock | G10L 15/12 704/241 |
| 7,099,379 | B2 * | 8/2006 | Nuytkens | H04B 1/707 348/E7.024 |
| 8,576,822 | B2 * | 11/2013 | Yoon | H04L 5/0023 370/342 |
| 2005/0257239 | A1 * | 11/2005 | Evans | H04N 5/783 725/88 |
| 2009/0141676 | A1 * | 6/2009 | Maheshwari | H04L 1/1812 370/329 |
| 2009/0176463 | A1 * | 7/2009 | Raaf | H04B 7/0689 455/101 |

(Continued)

OTHER PUBLICATIONS

International Search Report and Written Opinion—PCT/US2018/037714—ISA/EPO—Sep. 3, 2018.

*Primary Examiner* — Thai D Hoang
(74) *Attorney, Agent, or Firm* — Qualcomm Incorporated (57) ABSTRACT

Various aspects described herein relate to techniques for uplink reference signal sequence design in wireless communications systems. A method, a computer-readable medium, and an apparatus are provided. In an aspect, the method includes identifying a set of sequences to include at least a base sequence, a reverse order sequence of the base sequence, a complex conjugate sequence of the base sequence, or a reverse order complex conjugate sequence of the base sequence, and transmitting an uplink reference signal based on at least one of the sequences in the set. The techniques described herein may apply to different communications technologies, including 5th Generation (5G) New Radio (NR) communications technology.

44 Claims, 9 Drawing Sheets

(56) References Cited

U.S. PATENT DOCUMENTS

| | | | |
|---|---|---|---|
| 2012/0177145 A1* | 7/2012 | Han | H04L 5/0007 375/308 |
| 2015/0264638 A1* | 9/2015 | Han | H04W 48/16 370/329 |
| 2016/0360463 A1* | 12/2016 | Kim | H04B 7/0617 |
| 2019/0207661 A1* | 7/2019 | Froberg Olsson | H04B 7/0617 |

* cited by examiner

| u | φ(0),...,φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Group 1 has two sequences:

| -3 | -3 | -3 | -3 | 1  | 1  | -3 | -3 | 1  | -3 | 1  | -3 |
|----|----|----|----|----|----|----|----|----|----|----|----|
| -3 | 1  | -3 | 1  | -3 | -3 | 1  | 1  | -3 | -3 | -3 | -3 |

Group 2 to Group 8: each group has four sequences:

| -3 | 1  | -1 | 3  | 3  | -1 | 1  | -3 | -3 | -3 | -3 | -3 |
|----|----|----|----|----|----|----|----|----|----|----|----|
| -3 | 1  | 3  | -1 | -1 | 3  | 1  | -3 | -3 | -3 | -3 | -3 |
| -3 | -3 | -3 | -3 | -3 | 1  | -1 | 3  | 3  | -1 | 1  | -3 |
| -3 | -3 | -3 | -3 | -3 | 1  | 3  | -1 | -1 | 3  | 1  | -3 |
| -3 | 1  | 3  | -3 | -1 | -1 | -1 | -3 | -3 | 3  | -1 | -3 |
| -3 | 3  | -1 | -3 | -3 | 3  | 3  | 3  | -3 | -1 | 1  | -3 |
| -3 | -1 | 3  | -3 | -3 | -1 | -1 | -1 | -3 | 3  | 1  | -3 |
| -3 | 1  | -1 | -3 | 3  | 3  | 3  | -3 | -3 | -1 | 3  | -3 |
| -3 | 1  | 1  | 1  | 3  | -3 | -1 | -3 | -3 | -3 | 1  | -3 |
| -3 | 1  | -3 | -3 | -3 | 3  | -3 | -1 | 1  | 1  | 1  | -3 |
| -3 | 1  | -3 | -3 | -3 | -1 | -3 | 3  | 1  | 1  | 1  | -3 |
| -3 | 1  | 1  | 1  | -1 | -3 | 3  | -3 | -3 | -3 | 1  | -3 |
| -3 | 1  | -1 | 3  | 3  | -3 | -3 | 3  | 3  | -1 | 1  | -3 |
| -3 | 1  | 3  | -1 | -1 | -3 | -3 | -1 | -1 | 3  | 1  | -3 |
| -3 | 1  | -1 | -1 | 3  | 1  | 1  | 3  | -1 | -1 | 1  | -3 |
| -3 | 1  | 3  | 3  | -1 | 1  | 1  | -1 | 3  | 3  | 1  | -3 |
| -3 | 3  | 1  | -3 | -1 | -3 | -1 | -1 | -1 | 3  | -3 | -3 |
| -3 | -1 | 1  | -3 | 3  | -3 | 3  | 3  | 3  | -1 | -3 | -3 |
| -3 | -3 | 3  | -1 | -1 | -1 | -3 | -1 | -3 | 1  | 3  | -3 |
| -3 | -3 | -1 | 3  | 3  | 3  | -3 | 3  | -3 | 1  | -1 | -3 |
| -3 | 1  | -1 | -1 | 3  | 3  | -3 | -1 | -1 | -3 | -1 | -3 |
| -3 | -1 | -3 | -1 | -1 | -3 | 3  | 3  | -1 | -1 | 1  | -3 |
| -3 | 3  | -3 | 3  | 3  | -3 | -1 | -1 | 3  | 3  | 1  | -3 |
| -3 | 1  | 3  | 3  | -1 | -1 | -3 | 3  | 3  | -3 | 3  | -3 |
| -3 | -1 | 1  | -3 | 3  | -3 | -3 | 3  | -1 | -1 | -1 | -3 |
| -3 | -1 | -1 | -1 | 3  | -3 | -3 | 3  | -3 | 1  | -1 | -3 |
| -3 | 3  | 3  | 3  | -1 | -3 | -3 | -1 | -3 | 1  | 3  | -3 |
| -3 | 3  | 1  | -3 | -1 | -3 | -3 | -1 | 3  | 3  | 3  | -3 |

|  | LTE | Proposed 30 Seq. |
|---|---|---|
| Mean PAPR | 3.2070 | 2.4566 |
| Max PAPR | 4.0914 | 2.5500 |

620

|  | LTE | Proposed 30 Seq. |
|---|---|---|
| Correlation 95% tile | 0.4990 | 0.5 |
| Max Correlation | 0.6755 | 0.7071 |

UPLINK REFERENCE SIGNAL SEQUENCE DESIGN IN 5G NEW RADIO

CROSS-REFERENCE TO RELATED APPLICATION(S)

This application claims benefit of U.S. Provisional Application No. 62/521,200, entitled "Uplink Reference Signal Sequence Design in 5G New Radio" filed Jun. 16, 2017, which is expressly incorporated by reference herein in its entirety.

BACKGROUND

Aspects of the present disclosure relate generally to wireless communications systems, and more particularly, to techniques for uplink reference signal sequence design in wireless communications systems (e.g., a 5G New Radio system).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and better energy efficiency, new or improved approaches for uplink reference signal sequence design (e.g., for small resource blocks) may be desirable to improve resource utilization and cell coverage, in order to enhance waveform and air-interface design, to satisfy consumer demand, and to improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to uplink reference signal sequence design in a wireless communications system is provided. The method may include generating, at a user equipment (UE), an uplink reference signal (RS) sequence design based on a base sequence and a reverse order sequence of the base sequence. The method may further include transmitting, from the UE to a base station, an uplink reference signal based on the uplink RS sequence design.

In another aspect, a UE for use in wireless communications is provided. The UE may include memory that may include instructions executable by a processor coupled with the memory. The instructions may be executable by the processor to generate, at the UE, an uplink RS sequence design based on base sequence and a reverse order sequence of the base sequence. The instructions may further be executable by the processor to transmit, from the UE to a base station via a transceiver, an uplink reference signal based on the uplink RS sequence design.

In another aspect, another method for use in wireless communications is disclosed. The method may include generating, at the UE, an uplink RS sequence design based on a base sequence and a complex conjugate sequence of the base sequence. The method may further include transmitting, from the UE to a base station, an uplink reference signal based on the uplink RS sequence design.

In another example, a UE for use in wireless communications is disclosed. The UE may include memory that may include instructions executable by a processor coupled with the memory. The instructions may be executable by the processor to generate, at the UE, an uplink RS sequence design based on base sequence and a complex conjugate sequence of the base sequence. The instructions may further be executable by the processor to transmit, from the UE to a base station, an uplink reference signal based on the uplink RS sequence design.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

In a conventional communications system (e.g., an LTE system), uplink reference signals (RSs) may be used for channel estimation and/or channel sounding. In an aspect, for accurate channel estimation, RSs may need a constant amplitude in frequency domain, for equal excitation of all the allocated subcarriers for unbiased channel estimates. In some examples, the generation of RSs is based on sequences (e.g., Zadoff-Chu sequences), and for RS sequence design, it may be important to find sequences with low peak to average power ratio (PAPR) and/or small cross-correlation(s), in order to achieve better channel estimation, and/or reduce interference from different RSs transmitted on the same resources. However, a typical search for sequences with low PAPR and/or good cross-correlation property takes long time because a large group of sequences may need to be searched for to generate an uplink RS. As such, to reduce latency, extend cell coverage, and/or reduce system complexity, new or improved RS sequence design and scheme may be desired.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to a wireless communications system (e.g., a 5G NR system), in particular, techniques and schemes for uplink RS sequence design. Each of the aspects described herein may be performed or implemented in connection with FIGS. 1-8, which are described in more detail below.

Figure 1:
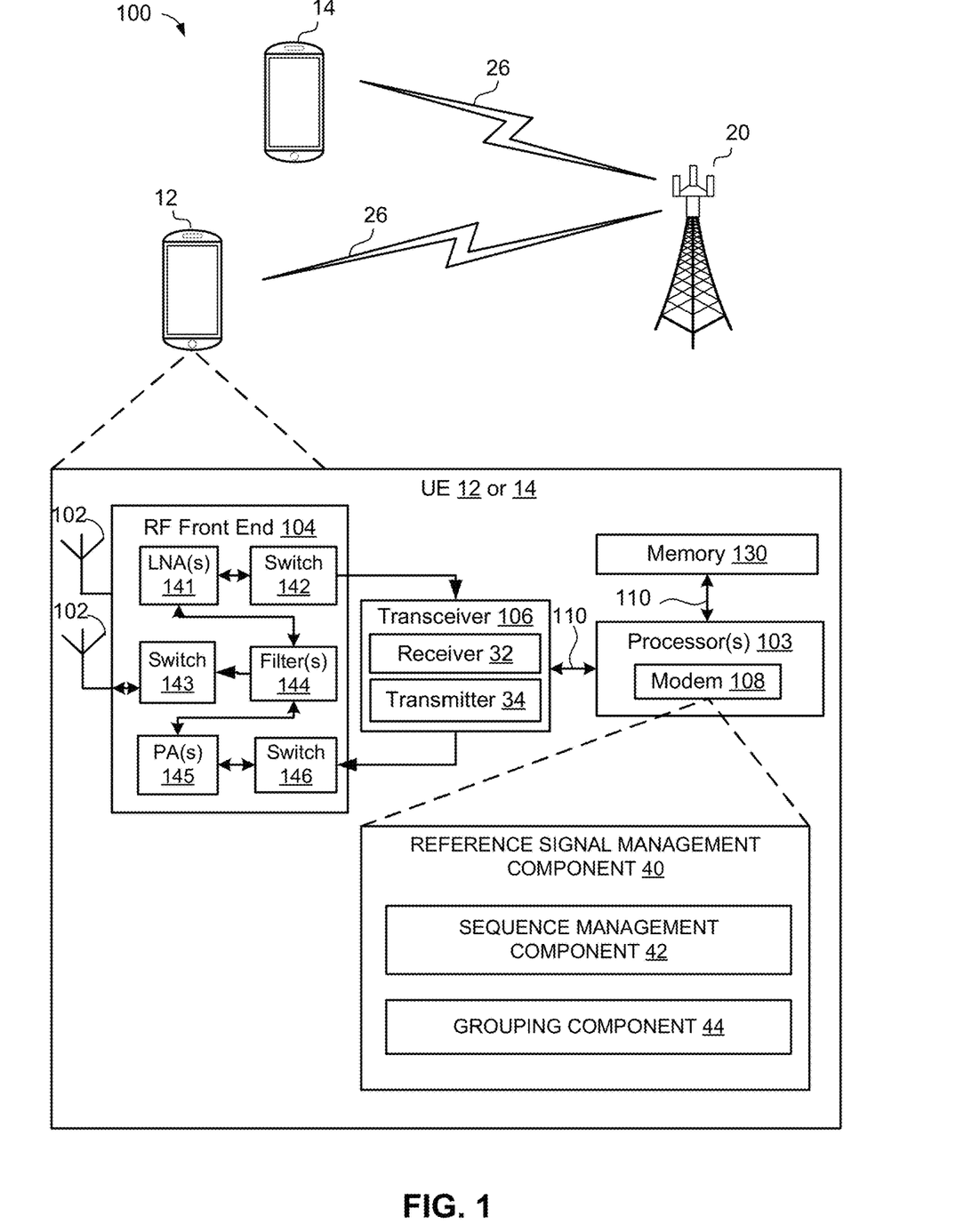
FIG. 1 is a block diagram of an example communications network (e.g., a 5G NR network) including at least one network entity in communication with one or more user equipments (UEs) configured to perform uplink reference signal (RS) transmission, according to one or more of the presently described aspects.

Referring to FIG. 1, in an aspect, a wireless communication system 100 includes at least one UE 12 or UE 14 in communication coverage of at least one network entity 20 (e.g., a base station or a GNB, or a cell thereof, in a 5G NR network). UE 12 and/or UE 14 may communicate with a network via the network entity 20. In some aspects, multiple UEs including at least the UE 12 and/or UE 14 may be in communication coverage with one or more network entities, including network entity 20. In an aspect, the network entity 20 may be a base station such as a gNB in a 5G NR network, and/or an eNB in a long term evolution (LTE) network. Although various aspects are described in relation to the Universal Mobile Telecommunications System (UMTS), an LTE network, or a 5G NR network, similar principles may be applied in other wireless wide area networks (WWAN). The wireless network may employ a scheme where multiple UEs may transmit on a channel. In an example, the UE 12 and/or UE 14 may transmit and/or receive wireless communications to and/or from the network entity 20. For example, the UE 12 and/or UE 14 may be actively communicating with the network entity 20.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device. Additionally, the network entity 20 may be a macrocell, picocell, femtocell, relay, Node B, mobile Node B, small cell box, UE (e.g., communicating in peer-to-peer or ad-hoc mode with the UE 12 and/or UE 14), or substantially any type of component that can communicate with the UE 12 and/or UE 14 to provide wireless network access to the UE 12 and/or UE 14.

According to the present aspects, the UE 12 and/or UE 14 may include one or more processors 103 and a memory 130 that may operate in combination with a reference signal management component 40 to control a sequence management component 42, and/or a grouping component 44, for performing uplink RS sequence design, management and transmission as described herein.

For example, the reference signal management component 40 may be configured to identify one or more sets of sequences used for uplink RS design and transmission. In an aspect, the term "component" as used herein may be one of the parts that make up a system, may be hardware, firmware, and/or software, and may be divided into other components. The reference signal management component 40 may be communicatively coupled with a transceiver 106, which may include a receiver 32 for receiving and processing RF signals and a transmitter 34 for processing and transmitting RF signals.

In some aspects, the reference signal management component 40 may include the sequence management component 42, and/or the grouping component 44, for performing uplink RS design, management and transmission. For example, the sequence management component 42 may be configured to identify, determine, or generate RS sequences used for RS transmissions. In an example, the grouping component 44 may be configured to group a set of sequences for uplink RS transmissions. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium, or non-transitory computer-readable storage medium). The receiver 32 may be, for example, a radio frequency (RF) receiver. In an aspect, the receiver 32 may receive signals transmitted by UE 12 and/or UE 14 or network entity 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to the reference signal management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the reference signal management component 40, including the sequence management component 42, and/or the grouping component 44.

The reference signal management component 40, sequence management component 42, and/or grouping component 44, may include hardware, firmware, and/or software code executable by a processor for performing RS design, management and related operations. For example, the hardware may include, for example, a hardware accelerator, or specialized processor.

Moreover, in an aspect, the UE 12 and/or UE 14 may include a RF front end 104 and transceiver 106 for receiving and transmitting radio transmissions, for example, wireless communications 26. For example, transceiver 106 may receive a RS signal that includes proposed uplink RS sequences from the UE 12 and/or other UEs (e.g., the UE 14). Depending on the UE behavior discussed herein, the transceiver 106 may transmit or may not transmit an uplink signal to the network entity 20. For example, transceiver 106 may communicate with modem 108 to transmit messages generated by the reference signal management component 40 and/or to receive messages and forward them to the reference signal management component 40.

RF front end 104 may be connected to one or more antennas 102 and may include one or more low-noise amplifiers (LNAs) 141, one or more switches 142, 143, 146, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, the LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the reference signal management component 40.

Further, for example, one or more PA(s) 145 may be used by the RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through an antenna 102 via the RF front end 104. In an aspect, the transceiver may be tuned to operate at specified frequencies such that the UE 12 and/or UE 14 can communicate with, for example, the network entity 20. In an aspect, for example, the modem 108 can configure the transceiver 106 to operate at a specified frequency and power level based on the UE configuration of the UE 12 and/or UE 14 and communication protocol used by modem 108.

In an aspect, the modem 108 can be a multiband-multi-mode modem, which can process digital data and communicate with the transceiver 106 such that the digital data is sent and received using the transceiver 106. In an aspect, the modem 108 can be multiband and be configured to support multiple frequency bands for a specific communications protocol. In an aspect, the modem 108 can be multimode and be configured to support multiple operating networks and communications protocols. In an aspect, the modem 108 can control one or more components of the UE 12 and/or UE 14 or the network entity 20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with the UE 12 and/or UE 14 as provided by the network during cell selection and/or cell reselection.

The UE 12 and/or UE 14, or the network entity 20 may further include memory 130, such as for storing data used herein and/or local versions of applications or Reference signal management component 40 and/or one or more of its subcomponents being executed by processor 103. The memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining the reference signal management component 40 and/or one or more of its subcomponents, and/or data associated therewith, when the UE 12 and/or UE 14 is operating the processor 103 to execute the reference signal management component 40 and/or one or more of the subcomponents of the reference signal management component 40. In another aspect, for example, the memory 130 may be a non-transitory computer-readable storage medium.

Figure 2:
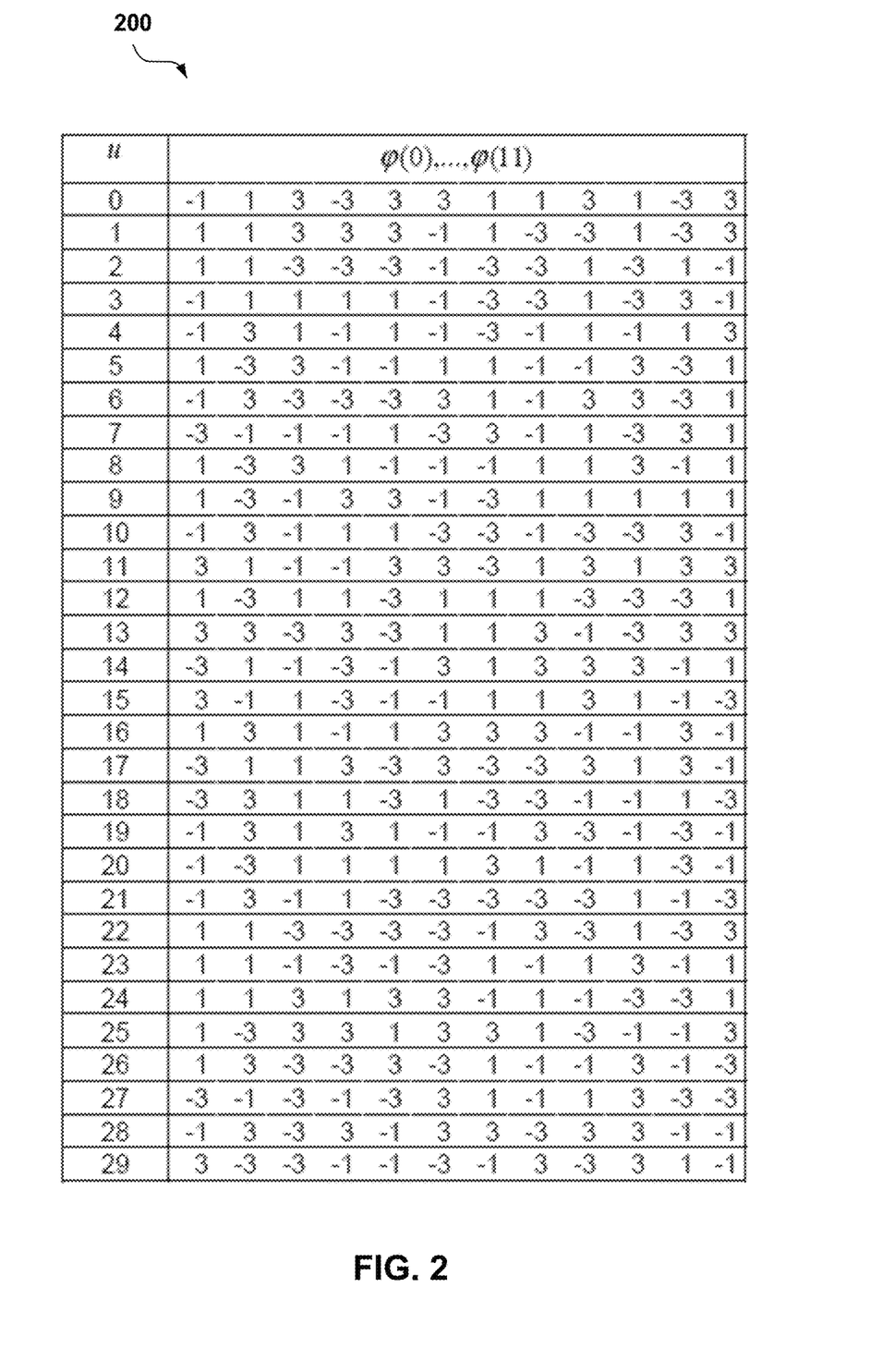
FIG. 2 is a table including RS sequences used by a conventional communications system (e.g., an LTE system, according to one or more of the presently described aspects.

Referring to FIG. 2, as discussed above, in a wireless communications system (e.g., an LTE system, or a 5G NR system), to generate or design an uplink RS, sequences with low PAPR and/or small cross-correlation property may need to be searched. In some cases, the uplink RS sequence may be used in one or more resource blocks (RBs) (e.g., 1, 2, 3, or 4 RBs). In some aspects, the uplink RS sequence design may include using complex conjugate and reversed index structure. In some examples, the RS in frequency domain may be represented by the following:

$$\exp(j \times \pi/4 \times \varphi(n))$$

where the sequence $\varphi(n)$ may be found in a table 200 in FIG. 2.

In some aspects, the uplink RS sequence design may be based on reversed ordering, complex conjugate, phase rotation, and/or phase length of one or more sequences (e.g., a base sequence). In some cases, an uplink RS sequence may be compute-based or random selected. In some examples, a certain threshold or parameters for PAPR and/or cross-correlation may be pre-determined or configured in advance. For example, for uplink RS design, a UE (e.g., the UE 12 or 14) and/or a base station (e.g., the network entity 20) may search for sequences with PAPR lower than a pre-determined threshold, sequences with cross-correlation smaller than a pre-determined threshold, or sequences with low PAPR and small cross-correlation property compared with one or more pre-determined thresholds.

In some examples, two properties may be used for uplink RS sequence design. One property is that reversing the order of a sequence (e.g., a base sequence) preserves the PAPR of the sequence, and the other property is that taking complex conjugate preserves the PAPR of the sequence. Therefore, by utilizing either one or both of the above mentioned properties, from one sequence (e.g., a base sequence), the UE or the base station may generate additional sequences (e.g., three additional sequences) which has the same PAPR. In an example, the sequences (e.g., in a sequence group), including the base sequence and three additional sequences, may be represented by the following two examples:

EXAMPLE 1

$\varphi(0), \varphi(1), \ldots, \varphi(10), \varphi(11)$ $\varphi(11), \varphi(10), \ldots, \varphi(1), \varphi(0)$ $\varphi(0)^*, \varphi(1)^*, \ldots, \varphi(10)^*, \varphi(11)^*$ $\varphi(11)^*, \varphi(10)^*, \ldots, \varphi(1)^*, \varphi(0)^*$

EXAMPLE 2

$\varphi(0), \varphi(1), \ldots, \varphi(10), \varphi(11)$ $\varphi(11), \varphi(10), \ldots, \varphi(1), \varphi(0)$ $\exp(j\pi/4)(\exp(-j\pi/4)\varphi(0))^*, \exp(j\pi/4)(\exp(-j\pi/4)\varphi(1)) ^*, \ldots, \exp(j\pi/4)(\exp(-j\pi/4)\varphi(11))^*$ $\exp(j\pi/4)(\exp(-j\pi/4)\varphi(11))^*, \exp(j\pi/4)(\exp(-j\pi/4)\varphi(10))^*, \ldots, \exp(j\pi/4)(\exp(-j\pi/4)\varphi(0))^*$ In some examples, a base sequence may correspond to a sequence group. Sequences of sequence group may be derived from the base sequence by means of different cyclic time shifts. One of these sequence groups may be used to support uplink transmission of one cell (e.g., uplink RS transmission). In some implementations, phase rotation in frequency domain may be used for uplink RS sequence design (e.g., the last two sequences in Example 2). In some cases, phase length in frequency domain may be shifted to time domain (e.g., cyclic time shifts). For example, one of the sequences may be a reverse order of the base sequence with the phase length. It should be appreciated that applying phase length in frequency domain would be same as applying cyclic time shift in the time domain.

Figure 3:
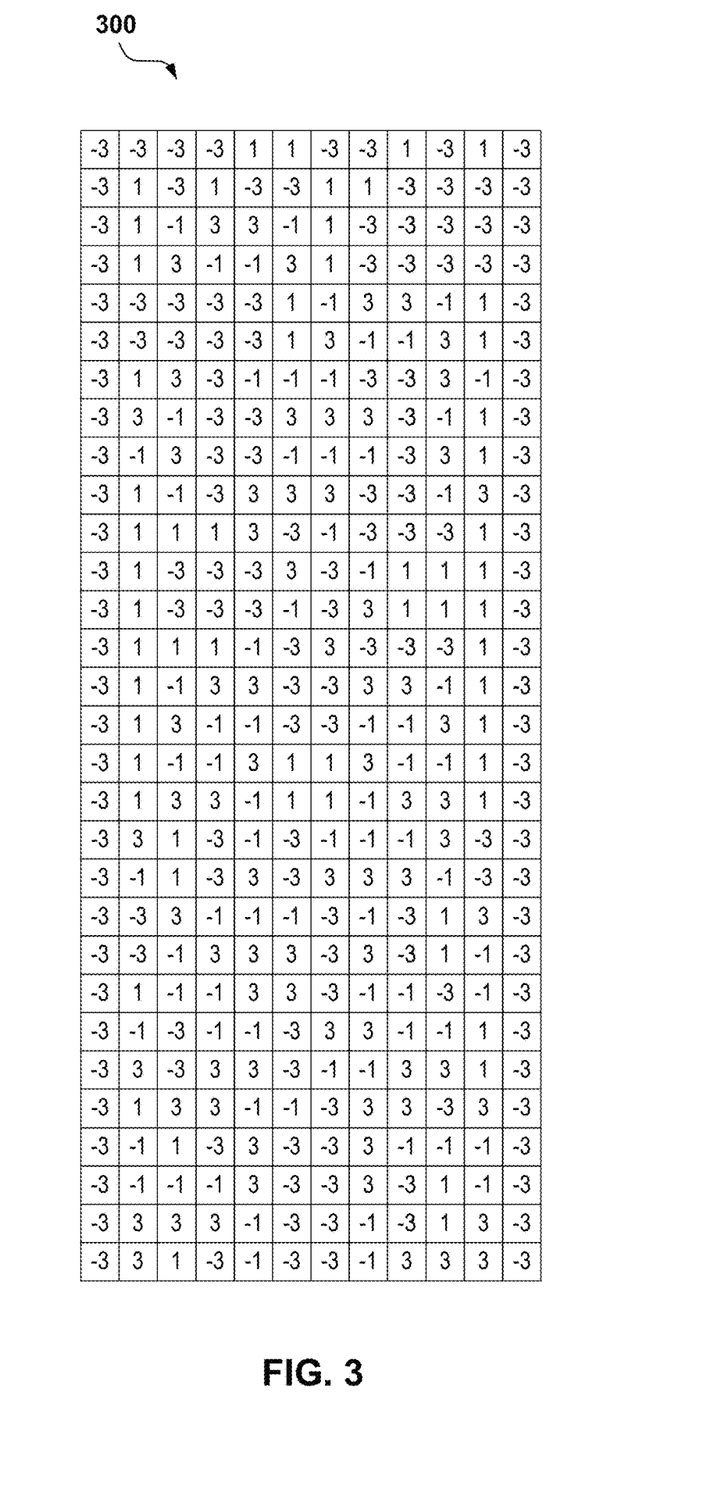
FIGS. 3-5 are examples of uplink RS sequences used for proposed RS sequence design, according to one or more of the presently described aspects.
Figure 4:
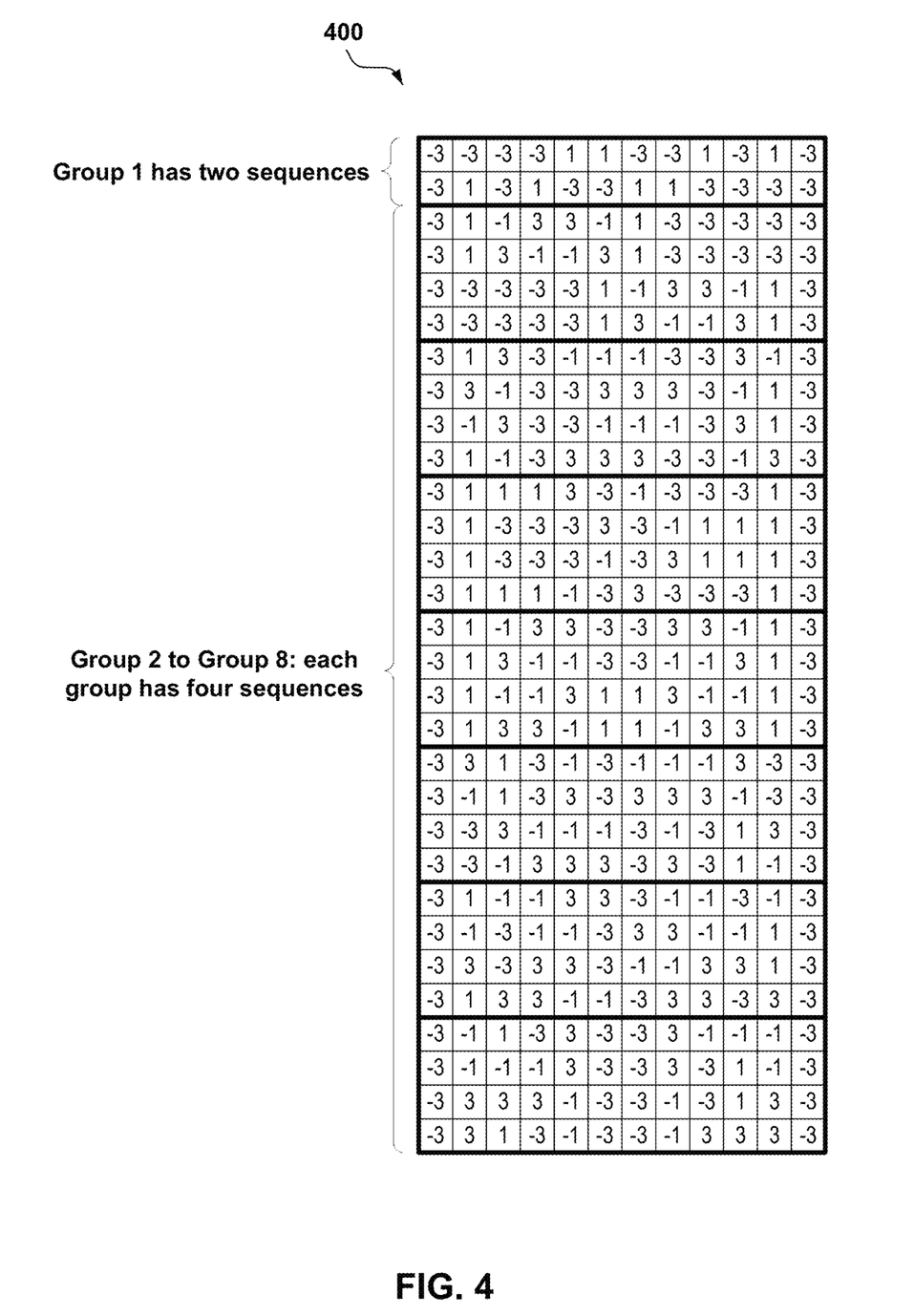
Figure 5:
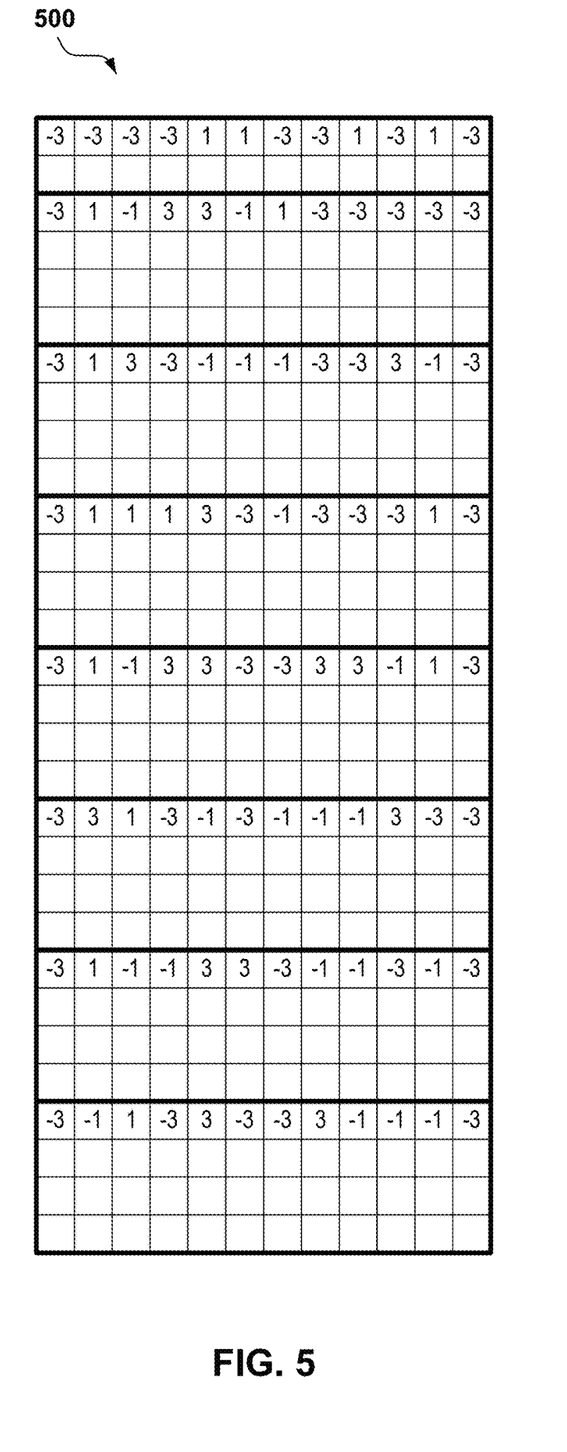

In FIGS. 3-5, examples of uplink RS sequence design using 12-length sequences are provided. Referring to FIG. 3, in an aspect, for example, a table 300 lists 30 sequences (12-length) that may be used for uplink RS sequence design. In some examples, each of the base sequence, the reverse order sequence of the base sequence, and the complex conjugate of the base sequence may be 12-length sequences (e.g., first 12-length base sequence, second 12-length reverse order sequence of the base sequence, third 12-length complex conjugate of the base sequence) stored in the same table 300 in a memory of the UE such that the UE may select a base sequence and one of reverse order sequence of the base sequence or complex conjugate of the base sequence from the same table to generate the uplink RS sequence.

Referring to FIG. 4, in an aspect of the present disclosure, some or all of the sequences in the table 300 may be grouped in sequence groups. For example, a table 400 may include the same sequences in the table 300 in FIG. 3, and may group the sequences in eight different groups (e.g., Group 1, Group 2, . . . , Group 8). In an aspect, the first sequence group (Group 1) may include two sequences, a first sequence (e.g., a base sequence), and a second sequence (e.g., a sequence with revered order of the first sequence). Because complex conjugate of the first or the second sequence gives a same/repeated sequence (identical sequence to the first or the second sequence), only two sequences (e.g., the first two sequences in Example 1 or Example 2, $\varphi_1(n)$ $\varphi_2(n)$) are included in the first sequence group (Group 1). From the second sequence group (Group 2) to the eighth sequence group (Group 8), each sequence group may include four sequences (e.g., same as the structure of Example 2), and the four sequences may be different.

In some aspects, one or more of the four-sequence groups (e.g., any group from Group 2 to Group 8) may be generated or configured by a pre-determined rule or scheme. For example, similar to Example 2 discussed above, the four sequences in a four-sequence group may be generated or represented by the following:

$\varphi_1 = \varphi(0), \varphi(1), \ldots, \varphi(10), \varphi(11);$ $\varphi_2 = \varphi(11), \varphi(10), \ldots, \varphi(1), \varphi(0);$ $\varphi_3 = \exp(j\pi/4)(\exp(-j\pi/4)\varphi(0))^*, \exp(j\pi/4)(\exp(-j\pi/4)\varphi(1))^*, \ldots, \exp(j\pi/4)(\exp(-j\pi/4)\varphi(11))^*$ $\varphi_4 = \exp(j\pi/4)(\exp(-j\pi/4)\varphi(11))^*, \exp(j\pi/4)(\exp(-j\pi/4)\varphi(10))^*, \ldots, \exp(j\pi/4)(\exp(-j\pi/4)\varphi(0))^*$ and/or $\exp(j \times \pi/4 \times \varphi_1(n))$ $\exp(j \times \pi/4 \times \varphi_2(n))$ $\exp(j \times \pi/4 \times \varphi_3(n))$ $\exp(j \times \pi/4 \times \varphi_4(n))$ In some cases, there may be some exceptions for the first sequence or the first sequence group. For example, the first sequence or the first sequence group may only have $\varphi_1(n)$ $\varphi_2(n)$.

Referring to FIG. 5, in an aspect, for example, a table 500 lists the first sequence in each of the eight (12-length) sequence groups that may be used for uplink RS sequence design. In some examples, each of the sequences in the table 500 may be considered as a base sequence, and which may be used for generating the other sequences in each sequence group. In some cases, the sequence generation may use the rules or schemes discussed herein, for example, in FIG. 2 and/or in FIG. 4.

Figure 6:
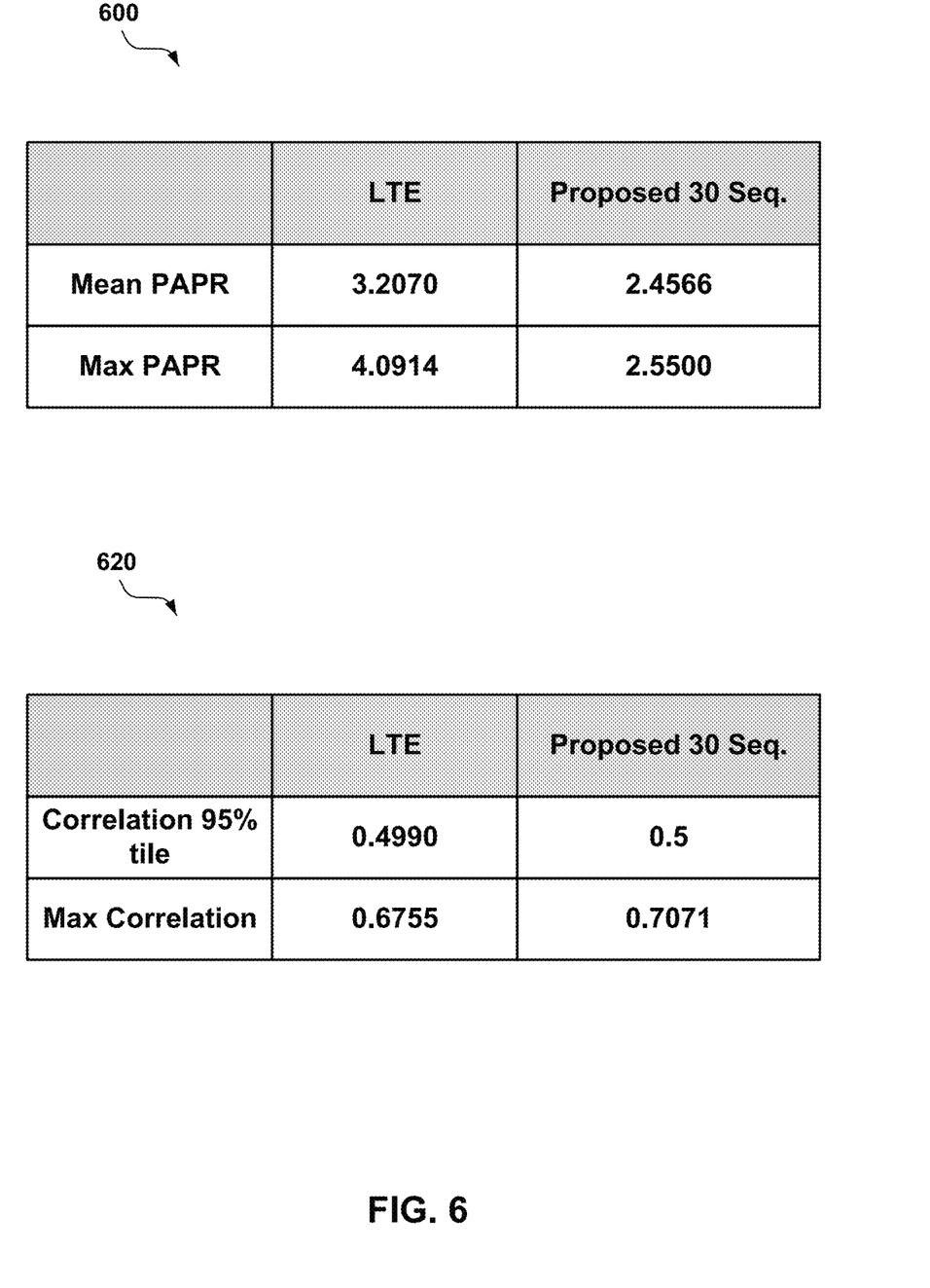
FIG. 6 are examples of peak to average power ratio (PAPR) and cross-correlation comparisons between using a conventional uplink RS sequence design (e.g., in an LTE system) and using the proposed uplink RS sequence design, according to one or more of the presently described aspects.

Referring to FIG. 6, in an aspect, a table 600 provides an example of PAPR comparisons between using a conventional uplink RS sequence design (e.g., in an LTE system) and using the proposed uplink RS sequence design (e.g., using 30 sequences). In an aspect, the comparisons provide mean PAPRs and maximum PAPR between the two designs/schemes, which show that the proposed sequence design performs better with lower PAPRs.

In addition, a table 620 in FIG. 6 provides an example of cross-correlation comparisons between using a conventional uplink RS sequence design (e.g., in an LTE system) and using the proposed uplink RS sequence design (e.g., using 30 sequences). In an aspect, the comparisons provide correlation 95% tiles and maximum correlations between the two designs/schemes, which show that the proposed sequence design performs better in cross-correlation.

Figure 7A:
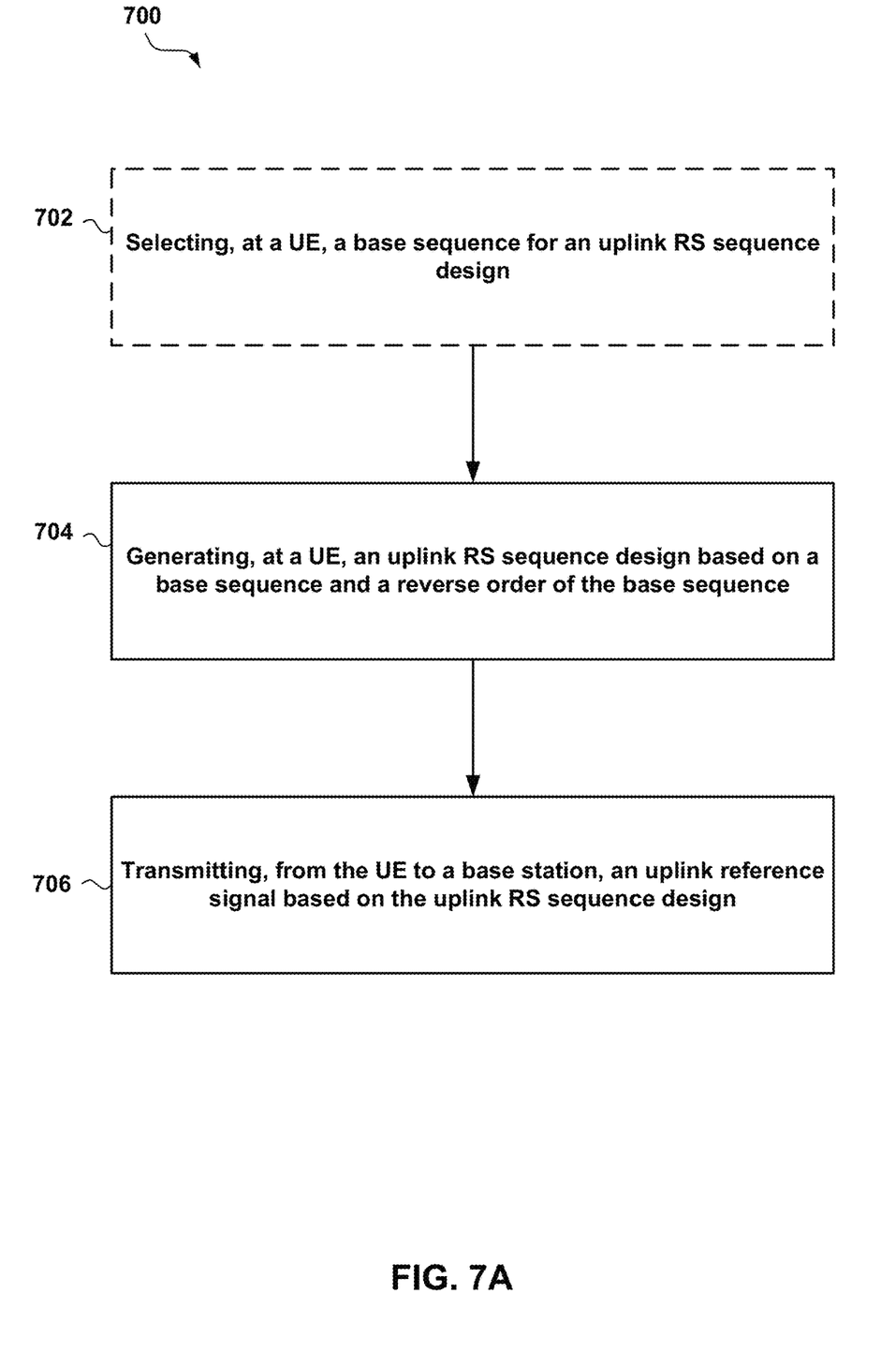
FIGS. 7A and 7B are flow charts of an example methods for uplink RS transmission, according to one or more of the presently described aspects.

Referring to FIG. 7A, in an operational aspect, a UE (e.g., the UE 12 or 14) may perform one or more aspects of a method 700 for uplink RS transmission in a wireless communications system (e.g., a 5G NR system). For example, one or more of the processors 103, the memory 130, the modem 108, the transceiver 106, the reference signal management component 40, and/or the sequence management component 42, may be configured to perform one or more aspects of the method 700.

In an aspect, at block 702, the method 700 may optionally include selecting, at a UE, a base sequence for an uplink RS sequence design used for channel estimation. In an aspect, for example, the reference signal management component 40 and/or the sequence management component 42, e.g., in conjunction with one or more of the processors 103, the memory 130, the modem 108, and/or the transceiver 106, may be configured to identify a set of sequences to include a base sequence, a reverse order sequence of the base sequence, a complex conjugate sequence of the base sequence, and/or a reverse order complex conjugate sequence of the base sequence.

In an aspect, at block 704, the method 700 may include generating, at a UE, an uplink RS sequence design based on base sequence and a reverse order sequence of the base sequence. In some examples, generating the uplink RS sequence design may include pairing or associating the base sequence with the reverse order sequence of the base sequence. The term "pairing" or "associating" in the context of sequences may refer to generating one sequence from another sequence by associating the first sequence with the second sequence. For example, with a set of available sequence s(1), s(2) . . . S(12), an output sequence may be generated by pairing or associating the order of the sequences to s(12) s(11) . . . s(1) for example. Thus, in the above example, the uplink RS sequence may be generating by associating or pairing a base sequence (e.g., first sequence) and a reverse order sequence of the base sequence (e.g., second sequence) in a specified order to generate the uplink RS sequence. In some examples, both the base sequence and the reverse order sequence of the base sequence each may be 12-length sequences (e.g., first 12-length base sequence and second 12-length reverse order sequence of the base sequence) stored in the same table in a memory of the UE such that the UE may select each of the base sequence and reverse order sequence of the base sequence from the same table. In some examples, aspects of block 704 may be performed by the sequence management component 42 described with reference to FIG. 1.

In an aspect, at block 706, the method 700 may include transmitting an uplink reference signal an uplink reference signal based on the uplink RS sequence design. In an aspect, for example, the reference signal management component 40 and/or the sequence management component 42, e.g., in conjunction with one or more of the processors 103, the memory 130, the modem 108, and/or the transceiver 106, may be configured to transmit, via the transceiver 106, an uplink reference signal based on at least one of the sequences in the set.

Figure 7B:
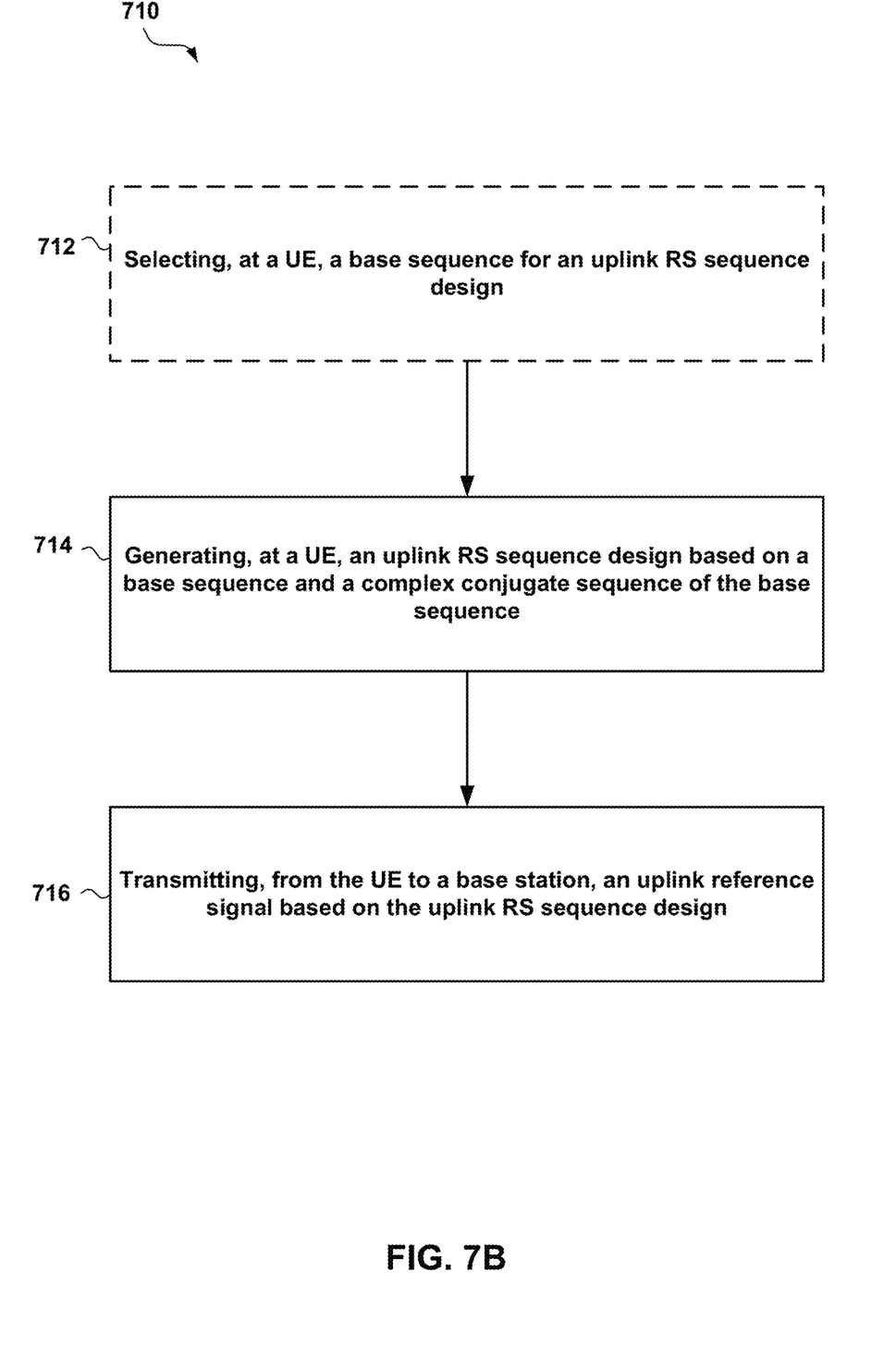

Referring to FIG. 7B, in an operational aspect, a UE (e.g., the UE 12 or 14) may perform one or more aspects of a method 710 for uplink RS transmission in a wireless communications system (e.g., a 5G NR system). For example, one or more of the processors 103, the memory 130, the modem 108, the transceiver 106, the reference signal management component 40, and/or the sequence management component 42, may be configured to perform one or more aspects of the method 710.

In an aspect, at block 712, the method 710 may optionally include selecting, at a UE, a base sequence for an uplink RS sequence design used for channel estimation. In an aspect, for example, the reference signal management component 40 and/or the sequence management component 42, e.g., in conjunction with one or more of the processors 103, the memory 130, the modem 108, and/or the transceiver 106, may be configured to identify a set of sequences to include a base sequence, a reverse order sequence of the base sequence, a complex conjugate sequence of the base sequence, and/or a reverse order complex conjugate sequence of the base sequence.

In an aspect, at block 714, the method 710 may include generating, at a UE, an uplink RS sequence design based on base sequence and a complex conjugate sequence of the base sequence. In some examples, generating the uplink RS sequence design may include pairing or associating the base sequence with the complex conjugate sequence of the base sequence. Thus, in the above example, the uplink RS sequence may be generating by associating or pairing a base sequence (e.g., first sequence) and a complex conjugate sequence of the base sequence (e.g., second sequence) in a specified order to generate the uplink RS sequence. In some examples, both the base sequence and the conjugate sequence of the base sequence each may be 12-length sequences (e.g., first 12-length base sequence and second 12-length conjugate sequence of the base sequence) stored in the same table in a memory of the UE such that the UE may select each of the base sequence and conjugate sequence of the base sequence from the same table. In some examples, aspects of block 714 may be performed by the sequence management component 42 described with reference to FIG. 1.

In an aspect, at block 716, the method 700 may include transmitting an uplink reference signal an uplink reference signal based on the uplink RS sequence design. In an aspect, for example, the reference signal management component 40 and/or the sequence management component 42, e.g., in conjunction with one or more of the processors 103, the memory 130, the modem 108, and/or the transceiver 106, may be configured to transmit, via the transceiver 106, an uplink reference signal based on at least one of the sequences in the set.

Figure 8:
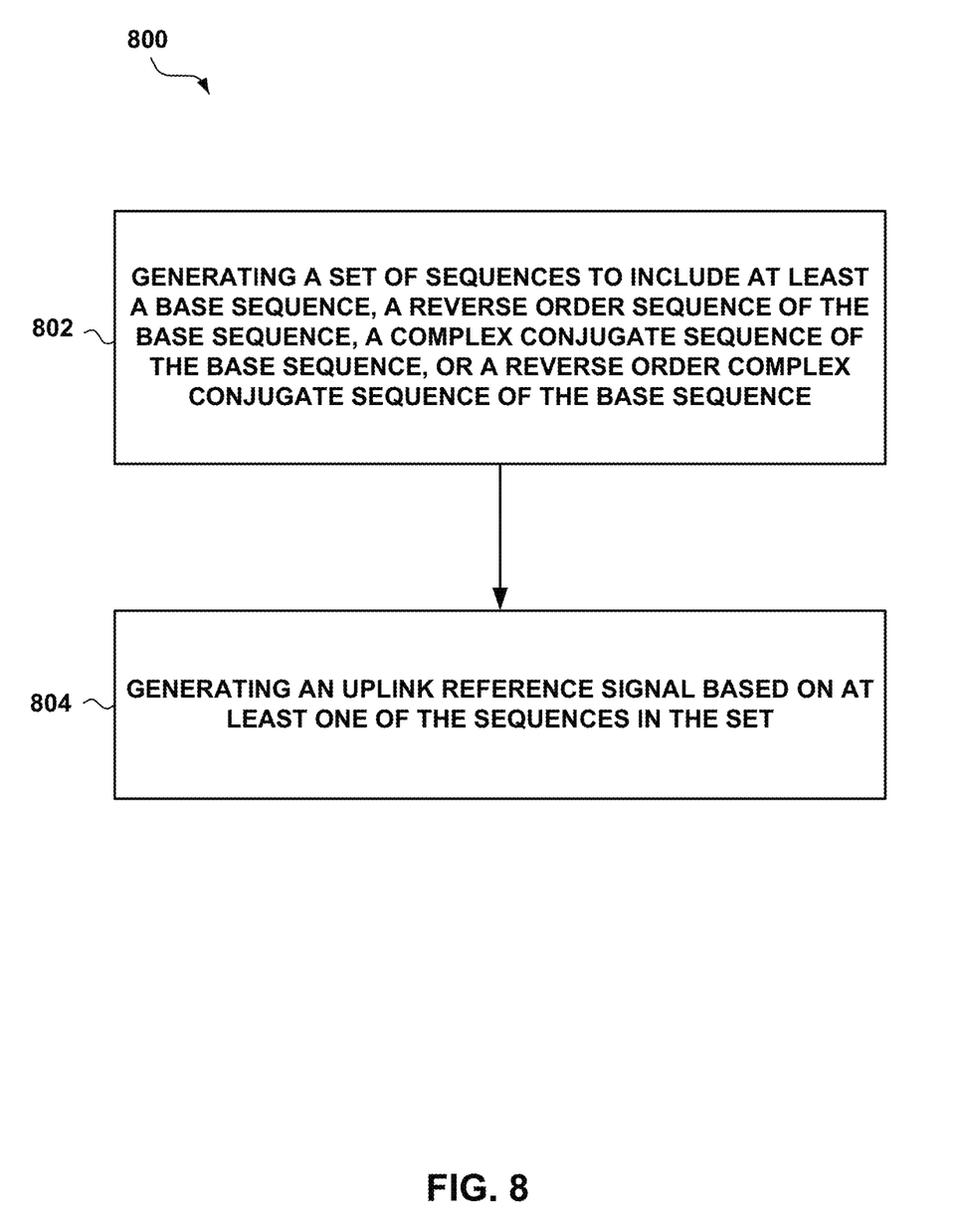
FIG. 8 is a flow chart of a second example method for uplink RS transmission, according to one or more of the presently described aspects.

Referring to FIG. 8, in an operational aspect, a UE (e.g., the UE 12 or 14) may perform one or more aspects of a method 800 for uplink RS design and generation in a wireless communications system (e.g., a 5G NR system). For example, one or more of the processors 103, the memory 130, the modem 108, the transceiver 106, the reference signal management component 40, and/or the sequence management component 42, may be configured to perform one or more aspects of the method 800.

In an aspect, at block 802, the method 800 may include generating a set of sequences to include at least a base sequence, a reverse order sequence of the base sequence, a complex conjugate sequence of the base sequence, or a reverse order complex conjugate sequence of the base sequence. In an aspect, for example, the reference signal management component 40 and/or the sequence management component 42, e.g., in conjunction with one or more of the processors 103, the memory 130, the modem 108, and/or the transceiver 106, may be configured to generate a set of sequences to include a base sequence, a reverse order sequence of the base sequence, a complex conjugate sequence of the base sequence, and/or a reverse order complex conjugate sequence of the base sequence. In some examples, the sequences in the set may have a same or similar PAPR.

In an aspect, at block 804, the method 800 may include generating an uplink reference signal based on at least one of the sequences in the set. In an aspect, for example, the reference signal management component 40, and/or the sequence management component 42, e.g., in conjunction with one or more of the processors 103, the memory 130, the modem 108, and/or the transceiver 106, may be configured to generate an uplink reference signal based on at least one of the sequences in the set.

In another aspect, the method 800 may optionally include generating a group of sequences, and the group of sequences may include the base sequence and the reverse order sequence of the base sequence.

In another aspect, the method 800 may optionally include generating one or more groups of sequences, and each of the one or more groups may include the base sequence, the reverse order sequence of the base sequence, the complex conjugate sequence of the base sequence, and/or the reverse order complex conjugate sequence of the base sequence.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for use in wireless communications, comprising:
generating, at a user equipment (UE), an uplink reference signal (RS) sequence design based, at least in part, on a base sequence and a reverse order sequence of the base sequence and a first sequence of values stored in a table in a memory of the UE, wherein the table comprises at least a first sequence of an n-number of values for a $\varphi(n)$, and the base sequence is given by:

$\exp(j \times \pi/4 \times \varphi(n))$; and transmitting, from the UE to a base station, an uplink reference signal based on the uplink RS sequence design.

2. The method of claim 1, further comprising:
selecting, at the UE, the first sequence of values.

3. The method of claim 2, wherein a plurality of tables, including the table, are stored in the memory of the UE, and wherein the selecting the first sequence of values further comprises:
selecting the table from the plurality of tables.

4. The method of claim 1, wherein generating the uplink RS sequence design comprises pairing the base sequence with the reverse order sequence of the base sequence.

5. The method of claim 1, wherein the uplink RS sequence design based on the base sequence and the reverse order sequence of the base sequence has a same peak to average power ratio (PAPR) of the transmitted uplink reference signal.

6. The method of claim 1, wherein
generating the uplink RS sequence design further comprises selecting the first sequence of values and at least a second sequence of values stored in the table wherein the second sequence of values corresponds to the reverse order sequence of the base sequence.

7. The method of claim 1, wherein the table comprises a set of sequences of values, each sequence of values having a first length.

8. The method of claim 7, wherein the set of sequence values includes the first sequence of values, and a second sequence of values corresponding to the reverse order sequence of the base sequence.

9. The method of claim 8, wherein the first sequence of values and the second sequence of values comprise a two-sequence sequence group in the table.

10. The method of claim 7, wherein the set of sequence values includes the first sequence of values, a second sequence of values corresponding to the reverse order sequence of the base sequence, a third sequence of values corresponding to a complex conjugate sequence of the base sequence, and a fourth sequence of values corresponding to complex conjugate sequence of the reverse order sequence of the base sequence.

11. The method of claim 10, wherein the first sequence of values, the second sequence of values, the third sequence of values, and the fourth sequence of values comprise a four-sequence group in the table.

12. The method of claim 7, wherein the set of sequence values comprise a plurality of sequence groups, each of the plurality of sequence groups including a different subset of the set of sequence values.

13. The method of claim 12, wherein one of the plurality of sequence groups comprises either only the first sequence of values, or the first sequence of values and only one other sequence of values.

14. The method of claim 12, wherein one of the plurality of sequence groups comprises four different sequences of values.

15. The method of claim 12, wherein the plurality of sequence groups includes thirty different sequences of values corresponding to a single two-sequence group, and seven different four-sequence groups.

16. The method of claim 7, wherein each sequence of values in the set of sequence values includes n-number of values for $\varphi(n)$, the n-number of values corresponding to the first length.

17. The method of claim 16, wherein each of the set of sequences of values comprises a different 12-length sequence of values for $\varphi(n)$, as $\varphi(0) \ldots, \varphi(11)$.

18. The method of claim 17, wherein one of the different 12-length sequence indicates values for $\varphi(0)=(-3)$, $\varphi(1)=(-1)$, $\varphi(2)=(-3)$, $\varphi(3)=(-1)$, $\varphi(4)=(-1)$, $\varphi(5)=(-3)$, $\varphi(6)=(3)$, $\varphi(7)=(3)$, $\varphi(8)=(-1)$, $\varphi(9)=(-1)$, $\varphi(10)=(-1)$, and $\varphi(11)=(-3)$.

19. The method of claim 17, wherein one of the different 12-length sequence indicates values for $\varphi(0)=(-3)$, $\varphi(1)=(1)$, $\varphi(2)=(-1)$, $\varphi(3)=(-1)$, $\varphi(4)=(3)$, $\varphi(5)=(3)$, $\varphi(6)=(-3)$, $\varphi(7)=(-1)$, $\varphi(8)=(-1)$, $\varphi(9)=(-3)$, $\varphi(10)=(-1)$, and $\varphi(11)=(-3)$.

20. The method of claim 7, wherein a plurality of tables, including the table, are stored in the memory of the UE.

21. The method of claim 20, wherein a second table of the plurality of tables includes a second set of sequences of values having a second length, wherein the second length is different from the first length of the set of sequence values in the table.

22. A user equipment (UE) for use in wireless communications, comprising:
a transmitter;
a memory configured to store instructions; and
at least one processor communicatively coupled with the transmitter and the memory, wherein the at least one processor is configured to execute the instructions to:
generate an uplink reference signal (RS) sequence design based, at least in part, on a base sequence and a reverse order sequence of the base sequence and a first sequence of values stored in a table in a memory of the UE, wherein the table comprises at least a first sequence of an n-number of values for a $\varphi(n)$, and the base sequence is given by:

$$\exp(j \times \pi/4 \times \varphi(n)); \text{ and}$$

transmit, via the transmitter, an uplink reference signal based on the uplink RS sequence design.

23. The UE of claim 22, wherein the at least one processor is further configured to execute the instructions to:
the first sequence of values.

24. The UE of claim 23, wherein a plurality of tables, including the table, are stored in the memory of the UE, and wherein the at least one processor is further configured to execute the instructions to:
select the table from the plurality of tables.

25. The UE of claim 22, wherein the at least one processor is further configured to execute the instructions to:
pair the base sequence with the reverse order sequence of the base sequence.

26. The UE of claim 22, the uplink RS sequence design based on the base sequence and the reverse order sequence of the base sequence has a same peak to average power ratio (PAPR) of the transmitted uplink reference signal.

27. The UE of claim 22, wherein the at least one processor is further configured to execute the instructions to:
select the first sequence of values and at least a second sequence of values stored in the table wherein the second sequence of values corresponds to the reverse order sequence of the base sequence.

28. The UE of claim 22, wherein the table comprises a set of sequences of values, each sequence of values having a first length.

29. The UE of claim 28, wherein the set of sequence values includes the first sequence of values, and a second sequence of values corresponding to the reverse order sequence of the base sequence.

30. The UE of claim 29, wherein the first sequence of values and the second sequence of values comprise a two-sequence sequence group in the table.

31. The UE of claim 28, wherein the set of sequence values includes the first sequence of values, a second sequence of values corresponding to the reverse order sequence of the base sequence, a third sequence of values corresponding to a complex conjugate sequence of the base sequence, and a fourth sequence of values corresponding to complex conjugate sequence of the reverse order sequence of the base sequence.

32. The UE of claim 31, wherein the first sequence of values, the second sequence of values, the third sequence of values, and the fourth sequence of values comprise a four-sequence group in the table.

33. The UE of claim 28, wherein the set of sequence values comprise a plurality of sequence groups, each of the plurality of sequence groups including a different subset of the set of sequence values.

34. The UE of claim 33, wherein one of the plurality of sequence groups comprises either only the first sequence of values, or the first sequence of values and only one other sequence of values.

35. The UE of claim 33, wherein one of the plurality of sequence groups comprises four different sequences of values.

36. The UE of claim 33, wherein the plurality of sequence groups includes thirty different sequences of values corresponding to a single two-sequence group, and seven different four-sequence groups.

37. The UE of claim 28, wherein each sequence of values in the set of sequence values includes n-number of values for $\varphi(n)$, the n-number of values corresponding to the first length.

38. The UE of claim 37, wherein each of the set of sequences of values comprises a different 12-length sequence of values for $\varphi(n)$, as $\varphi(0) \ldots, \varphi(11)$.

39. The UE of claim 38, wherein one of the different 12-length sequence indicates values for $\varphi(0)=(-3)$, $\varphi(1)=(-1)$, $\varphi(2)=(-3)$, $\varphi(3)=(-1)$, $\varphi(4)=(-1)$, $\varphi(5)=(-3)$, $\varphi(6)=(3)$, $\varphi(7)=(3)$, $\varphi(8)=(-1)$, $\varphi(9)=(-1)$, $\varphi(10)=(-1)$, and $\varphi(11)=(-3)$.

40. The UE of claim 38, wherein one of the different 12-length sequence indicates values for $\varphi(0)=(-3)$, $\varphi(1)=(1)$, $\varphi(2)=(-1)$, $\varphi(3)=(-1)$, $\varphi(4)=(3)$, $\varphi(5)=(3)$, $\varphi(6)=(-3)$, $\varphi(7)=(-1)$, $\varphi(8)=(-1)$, $\varphi(9)=(-3)$, $\varphi(10)=(-1)$, and $\varphi(11)=(-3)$.

41. The UE of claim 28, wherein a plurality of tables, including the table, are stored in the memory of the UE.

42. The UE of claim 41, wherein a second table of the plurality of tables includes a second set of sequences of values having a second length, wherein the second length is different from the first length of the set of sequence values in the table.

43. A user equipment (UE) for use in wireless communications, comprising:
means for generating an uplink reference signal (RS) sequence design based, at least in part, on a base sequence and a reverse order sequence of the base sequence and a first sequence of values of a table comprising at least a first sequence of an n-number of values for a $\varphi(n)$, and wherein the base sequence is given by:

$$\exp(j \times \pi/4 \times \varphi(n)); \text{ and}$$

means for transmitting an uplink reference signal based on the uplink RS sequence design to a base station.

44. An article of manufacture comprising:
a non-transitory computer readable medium having stored therein instructions executable by one or more processors of a user equipment (UE) to:
generate an uplink reference signal (RS) sequence design based, at least in part, on a base sequence and a reverse order sequence of the base sequence and a first sequence of values of a table comprising at least a first sequence of an n-number of values for a $\varphi(n)$, and wherein the base sequence is given by:

$$\exp(j \times \pi/4 \times \varphi(n)); \text{ and}$$

initiate transmission of an uplink reference signal based on the uplink RS sequence design to a base station.

* * * * *